United States Patent
Weinberg et al.

(10) Patent No.: US 7,672,942 B2
(45) Date of Patent: Mar. 2, 2010

(54) METHOD AND APPARATUS FOR MATCHING NON-NORMALIZED DATA VALUES

(75) Inventors: Paul N. Weinberg, Los Angeles, CA (US); Richard T. Endo, Los Angeles, CA (US); Philip A. Tinari, Van Nuys, CA (US); Ronen Cohen, Nahariya (IL); Anat Levi Segal, Shelomi (IL); Ariel Hazi, Los Angeles, CA (US)

(73) Assignee: SAP, AG, Walldorf (DE)

( * ) Notice: Subject to any disclaimer, the term of this patent is extended or adjusted under 35 U.S.C. 154(b) by 332 days.

(21) Appl. No.: 11/831,793

(22) Filed: Jul. 31, 2007

(65) Prior Publication Data

US 2008/0077573 A1    Mar. 27, 2008

Related U.S. Application Data (63) Continuation-in-part of application No. 11/416,466, filed on May 1, 2006, now Pat. No. 7,542,973.

(51) Int. Cl.
*G06F 7/00* (2006.01)
(52) U.S. Cl. .......................................................... 707/6
(58) Field of Classification Search ...................... 707/6
See application file for complete search history.

(56) References Cited

U.S. PATENT DOCUMENTS

| | | | |
|---|---|---|---|
| 2004/0003258 A1* | 1/2004 | Billingsley et al. | 713/182 |
| 2004/0037474 A1* | 2/2004 | Happel | 382/280 |
| 2004/0158562 A1* | 8/2004 | Caulfield et al. | 707/5 |

\* cited by examiner

*Primary Examiner*—Charles Rones
*Assistant Examiner*—Fazlul Quader
(74) *Attorney, Agent, or Firm*—Dalina Law Group, P.C.

(57) ABSTRACT

Enables locating and merging potential data record matches. Enables locating duplicates through the definition of matching strategies. Each strategy may include transformations, matching rules and scoring thresholds to implement fuzzy matches that match closely related data records that are not exact matches. Performing a search allows for narrowing down the records to a desired set on which to apply a given matching strategy. Merging is performed on the potential duplicates thus located to consolidate data and remove duplicates. By narrowing down the records to a closely related set via a search, merging is simplified to work on a small number of closely related records, thus simplifying the process. The total matching score obtained via execution of match strategies may be utilized to determine which potential record(s) to merge for example. May utilize past user input to provide intelligent inputs for rules, tokens, weights, fields, parameters or any other past user input.

20 Claims, 9 Drawing Sheets

| [Count] | [Class] | [Score] | [Account] | Name | |
|---|---|---|---|---|---|
| 0 | None | 10 | CERHUN | HUNDEMER, RUSS | 5131 TRIP |
| 0 | None | 30 | CERHYS | ROB HYSLOP | 22204 VIC |
| 1 | High | 95 | CERMAC | MACKAY, ROBIN | 6626 LOC |
| 0 | None | 36 | CERMAT | ROBERT MATEVOSSIAN | 7019 W OR |
| 1 | Low | 86 | CERMCK | ROBERT MCKEIRNAN - EMPLO | 1086 TWIN |
| 1 | Low | 74 | CERMIL | MILLER, RON | 24 YAWL S |
| 0 | None | 31 | CERMIR | RAY MIRAFLOR | 13868 OTT |
| 0 | None | 20 | CERNAK | NAKAMOTO, RICH | 1101 S BA |
| 0 | None | 45 | CERSVR | CERTIFIED SERVICES | 16140 LEA |
| 0 | None | 40 | CERTAN | TAN, RUBIN | 20954 VAN |
| 0 | None | 35 | CERTFD | CERTIFIED COMPONENTS | 5010 NOR |
| 0 | None | 30 | CERTIF | CERTIFIED BUILDING INSPECT | 23949 VIC |

| | [Merged Record] ▲ | POWSYS | ▼ | POWERS |
|---|---|---|---|---|
| Account Number | | | | |
| Name | | | | |
| English [US] | | POWSYS | | POWERS |
| Street | | POWER SYSTEMS RE | | POWER SYSTEMS RE |
| Postal Code | | 1301 CORPORATE CE | | 1301 CORPORATE CE |
| City | | 55121 | | 55121 |
| Region | | EAGAN | | EAGAN |
| Country | | MN, Minnesota | | MN, Minnesota |
| Telephone Number | | US, United States | | US, United States |
| Fax | | | | 612-454-0144 |
| Date on Which the Record wa | | | | |
| Name of person who created | | | | |
| Deletion Flag | | | | |
| Central Posting Block | | | | |
| Vendor Account Group | | 0001 | | 0001 |

1724 of 1724 records found     Matching Mode

| Matches | Merge | Transformations | Rules | Strategies | Workflows | Search |

Transformations

STREET NAME

Properties

| Name | STREET |
| Field | Street |
| Language | |
| Preview | 140 CHAPARRAL COURT SUITE 120 |

Substitutions

| Token | From | To |
|---|---|---|
| ☐ | . | |
| ☑ | ST | STREET |
| ☑ | AVE | AVENUE |
| ☑ | DR | DRIVE |
| ☑ | HWY | HIGHWAY |
| ☑ | BLVD | BOULEVARD |
| ☑ | PKWY | PARKWAY |
| ☐ | CT | COURT |

1724 of 1724 records found    Matching Mode

| Matches | Merge | Transformations | Rules | Strategies |

Strategies

MATCH_NAME_ADDR — 107

Properties

| Name | Value |
|---|---|
| Name | MATCH_NAME_ADDR |
| Max Score | 100 |
| Min Score | -5 |
| High Threshold | 90 |
| Low Threshold | 70 |

Scoring Rules

| Include | |
|---|---|
| ☑ | NAME |
| ☑ | POSTAL CODE |
| ☑ | CITY |
| ☑ | COUNTRY |
| ☑ | STREET |

Figure 9

METHOD AND APPARATUS FOR MATCHING NON-NORMALIZED DATA VALUES

This application is a continuation in part of U.S. Utility patent application Ser. No. 11/416,466 filed 1 May 2006 now U.S. Pat. No. 7,542,973, the specification of which is hereby incorporated herein by reference.

BACKGROUND OF THE INVENTION

1. Field of the Invention

Embodiments of the invention described herein pertain to the field of computer systems and software. More particularly, but not by way of limitation, one or more embodiments of the invention enable a method and apparatus for matching non-normalized data values to determine if two or more data items are related in accordance with configurable criteria, enable the merging of data items and further to learn which match criteria settings are appropriate based on previous user input or results.

2. Description of the Related Art

Matching or searching non-normalized records in a database or between multiple databases is error prone and inefficient. For instance, when matching a given string with a non-normalized field of a database many records that should match a given search string fail to match. Entries that represent the same item but have different formatting or irrelevant characters fail to match. Thus the amount of time required to find a match can be excessive. This is particularly the case if all permutations of the match are utilized in the search process. Values such as "123-x" do not match "123:x" for example although they may represent the same item. Other matches that fail include a match for example on "X.Y.Z. Corp" against "XYZ Inc." The related art fails to ignore "noise" characters and words when attempting to match items and in general do not match items in databases using fuzzy patterns or relevancy.

Historically, matching has been performed as part of an inbound cleansing process. Generally, known products do not attempt to de-duplicate data that has already been cleansed during import. Over time, as data entry occurs where human error is afoot, duplicates begin to creep into the database. Keeping data consistent across multiple distributed enterprise-wide computer systems is non-trivial. Establishing effective communication links between heterogeneous systems is the first step for making the data consistent. However, simply allowing all computer systems within an organization to communicate does not solve the problem. Even when data is shared throughout an enterprise, problems still arise since data may exist in different forms in different locations within the enterprise. Since the goal of absolutely accurate data is elusive, it is common for companies to maintain data in independent computer systems. For example, because of the difficulties associated with identifying and matching similar data, some companies maintain data for each corporate division in independent computational zones and only utilize such data within a division to make a business decision associated with that particular division. It is common after one company acquires another company for the computer systems of each company to remain autonomous. Thus, the possibility of identifying and matching common data items within each repository is generally very low.

To solve the problem of having duplicate data albeit in slightly different form, businesses attempt to identify similar data and integrate the data in a way that ensures the data remains consistent. Performing the integration is difficult and breaks down when new corporate computer systems are added through acquisition or changes in business systems and software occur. One method that is used by some organizations is to maintain "master data". Master data for example may be an organization's ideal form of a data item. Solutions for keeping the data consistent through the organization, i.e., propagating master data throughout the organization, are generally non-robust and brute force communication schemes that do not allow new data entries to be matched against existing data items to effectuate data consolidation at data entry time.

The inability to keep master data items consistent harms an organization's ability to leverage its assets and lower the cost of doing business. All areas of a business are affected by the inability to keep data as accurately as is possible. In summary, existing computer systems and methods lack effective mechanisms for performing data matching in a way that allows the system to learn when data matches are appropriate. For example, existing systems and methods do not have an ability to learn and consolidate two data items that originally where thought to be independent, but which have been matched above a threshold. The ability to learn which patterns in data are actually indicative of a match between two data items is not found in existing enterprise computing solutions.

Because of the limitations described above there is a need for a method and apparatus for matching non-normalized data values.

BRIEF SUMMARY OF THE INVENTION

Embodiments of the invention enable locating and merging potential data record matches. Potential data record matches include "identicals" (the same object in different systems) and "duplicates", (the same object in the same system). Regardless of the location of data, the term "duplicates" is utilized herein for simplicity to represent data that should be merged whether an "identical" or a "duplicate". The apparatus enables locating duplicates through the definition of matching strategies. Each strategy may include transformations, matching rules and scoring thresholds to implement fuzzy matches that match closely related data records that are not exact matches. Performing a search allows for narrowing down the records to a desired set on which to apply a given matching strategy. Merging is performed on the potential duplicates thus located to consolidate data and remove duplicates. By narrowing down the records to a closely related set via a search, merging is simplified to work on a small number of closely related records, thus simplifying the process. The total matching score obtained via execution of match strategies may be utilized to determine which potential record(s) to merge for example.

The invention provides rapid searching on strings that do not exactly match a full string held in a field. This allows searches to match strings that are close to the search string, and allows users to normalize data that would not be located with related art systems. In addition, through use of bit vectors, the invention provides for rapid matching. Missing and abbreviated data, or data having "noise" characters or strings do not preclude a match since relevancy weights allow for a match even if a field made up of one string is not an exact match with respect to a match string. By parsing the field(s) searched on, and calculating match scores, the most relevant matches are presented to a user. In addition, matches that would normally not be returned may show missing or non-normalized data that requires user intervention. The invention includes use of indexes to transform groups of related characters, for example a character with an umlaut to a standard character or string. The invention also provides the capability to match transposed characters and ignore "noise" characters or words. In addition, keyword indexes allow for several words to provide a match, for example, the word "Richard" may match "Rick", "Ric", "Rich", "Richie", Dick, or other known contractions or conversions of words. The system collapses this set of values into a bit vector for each word to build a synonym list.

An embodiment of the invention that is able to perform adaptive matching initiates by presenting data elements or fields from at least two records and obtaining selections from a user about which elements or fields appropriately match. Removing frequently used characters and strings, for example "Street", "Str.", "St.", "A", "The", etc., is performed to limit the portions of the data items to compare to a smaller set. Normalizing data is also performed in order to cleanse strings. For example, "California", "Calif.", "Cal.", may be converted to "CA." The apparatus may then perform tokenizing of multi-word text based data items to enable the comparison of individual tokens respective or irrespective of position. Assigning weights to each field or token is performed in one or more embodiments of the invention in order to provide for an eventual match score that takes into account the greater or lesser relevance of a match. Embodiments may also calculate a score based on the summation of the assigned weights for each matching field or token. Once similar records are identified (e.g., those above a certain threshold score) the apparatus generates groups of similar records to allow for the display of these records in relation to one another so that a decision can be made by the user and thereafter learned by the apparatus for future use. The user and/or the apparatus may assign thresholds for given records to determine when a match is a duplicate requiring no further user intervention. This allows records that have similar tokens to auto-match in future cases so that a user is not required to intervene in the matching process when a particular match score is achieved. The matching thresholds may be table specific or based on a field or value in a field for example.

Each of the steps implementing an embodiment of the apparatus may utilize past user input to provide intelligent choices to the user for streamlining subsequent matching operations. For example, adapting the choices that are provided to a user based on past user input allows match parameters to be configured in rapid fashion. Furthermore, normalization rules may be implemented for a match in varying form based on the data sources and the geography where the normalization has occurred in the past. This for example allows the apparatus to prioritize regional specific or language specific choices for user selection that are more appropriate for a given region.

The ability for the apparatus to learn which tokens are relevant and when they are relevant in a particular order allows the apparatus to present token lists limited by interactions with previous users. Based on previous user input, the apparatus is configured to learn for a given match whether to compare two records using all tokens in a given comparison field regardless of position or whether to compare all tokens irrespective of position for the comparison field. This allows the apparatus to construct further matches that take advantage of previous user inputs and provides a mechanism for the apparatus to provide better choices to a user for creation of a new match.

The apparatus is also configured in one or more embodiments of the invention to learn weights for tokens as previously gathered from user interactions. Hence the apparatus may provide lists or ranges of weights that previous been identified as confirmed matches in order to guide the user in creating a new match. The weights may be specific to particular groups of data or elements in various data sources. For example, a postal code may have a high weight in one match type and a low weight for a different match based on a different set of compared records or fields. The apparatus is configured to present the weights for tokens that make sense for the data that is being matched. This allows the apparatus to present choices to a user that minimize the amount of time that a user must interact with the apparatus to define a match. The matches may be applied to any record and field in any table of a corporate database.

The invention provides a great advantage in speed facilitated through a unique user interface for strategy configuration and execution which promotes usability as an advantage. A search pane is utilized to display records in a records pane. A matches tab shows at least one selected record as selected from the records pane with potential matches. A merge pane shows records side by side that have been selected for inclusion as selected from the matches tab. A transformations pane shows a list of the transformations along with the fields to apply the transformations to along with the list of substitutions to utilize. A rules pane contains a multi-object properties grid that includes a list of rules and a set of properties for each matching rule. A strategies pane shows a multi-object properties pane that includes the list of strategies, the list of properties including high and low thresholds and the list of scoring rules to be utilized. Any other type of graphical user interface elements besides panes may be utilized so long as the data associated with a respective pane is viewable by a user. The search pane allows for drilldown search as well as free-form search corresponding to fields of the records in a database. This pane allows for the narrowing of records to the amount desired.

The records pane includes a row/column grid listing the records that match the search parameters according to the search pane. Additional columns such as "count", "class" and "score" may be utilized to provide the number of matches, high/low probability of match and the weighted score of matches for example. In one or more embodiments, these columns are searchable by clicking on the header of the column to switch from low to high or high to low for example. These additional columns known as matching result columns show the result of a matching strategy.

The matches pane contains a records grid that in one or more embodiments, lists the selected record from the record pane along with all of the potential matches, although this is not required. By selecting desired records that appear to match in the matches pane, the selected records are listed in the merge pane for further processing. The matches pane may also display additional columns known as matching result columns that display further results obtained from executing a matching strategy. In one or more embodiments of the invention, more matching result columns may generally be displayed that in the records pane although this is not required and more, an equal number or less matching result columns may be displayed in the matches pane depending on the columns selected by a user.

The merge pane shows records side by side that have been selected for inclusion as selected from the matches tab. The individual fields that match or closely match may be highlighted or displayed in colors that signify the level of the match of the respective field.

The transformation pane contains a multi-object properties grid that includes three sub-panes. The three sub-panes are a transformations pane, properties pane and substitutions pane. The transformations pane lists the names of the transformations. The properties pane lists the set of properties for each transformation including the field to which the transformation is to be applied. The substitutions pane lists the substitutions that comprise the transformation. The transformations pane is used to select a named transformation and add, rename, delete and duplicate transformations and view/edit the transformation properties and to specify the set of substitutions to utilize in each transformation. A transformation applies one or more normalizing or cleansing operations to at least one field on a record-by-record basis.

The rules pane contains a multi-object properties grid that includes a list of rules and a set of properties for each matching rule. Specifically, each rule may be associated with a function such as a token match, a list of fields and scores for success, failure and undefined results. The scores are utilized to display in various matching result columns for example. For each field or combination of fields, a matching rule applies at least one matching function to either the original or previously transformed field value(s) and returns a score. A rule that references qualifiers is evaluated individually for each qualified link combination and the score for a record pair is the best score across the entire set of qualified links. This allows for applying matching rules to data that has been condensed with sparse fields removed from a main data table for example.

A strategies pane shows a multi-object properties pane that includes the list of strategies, the list of properties including high and low thresholds and the list of scoring rules to be utilized. Strategies may utilize one or more rules as defined in the rules pane for example. A matching strategy may be applied against the search results, selected records from the search results or all records in the database.

DETAILED DESCRIPTION OF THE INVENTION

A method and apparatus for matching non-normalized data values is now described by way of example. In the following description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
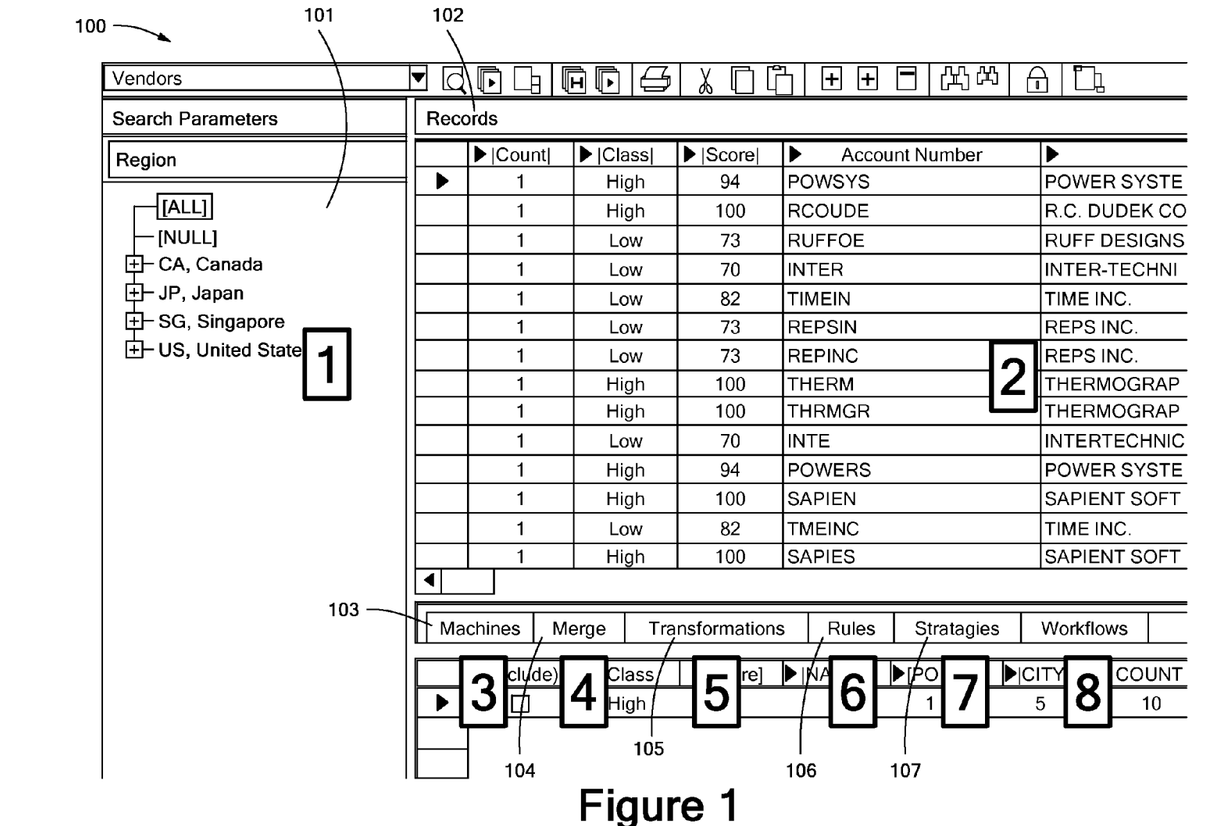
FIG. 1 shows an example graphical user interface that displays an embodiment of the invention.

FIG. 1 shows an example graphical user interface 100 that displays an embodiment of the invention. The invention provides a great advantage in speed facilitated through this unique graphical user interface for strategy configuration and execution which promotes usability as an advantage. Search pane 101 is utilized to search for and drill down into data which results in the display of records in records pane 102. Search pane 101 allows for drilldown search as well as freeform search corresponding to fields of the records in a database. This pane allows for the narrowing of records to the amount desired. Matches pane 103 (shown in the lower portion of FIG. 1 when selected by the associated tab) may be configured to show at least one selected record as selected from records pane 102 with potential matches. Merge pane 104 (which in this embodiment also includes an associated selection tab for showing the pane) shows records side by side (see FIG. 4) that have been selected for inclusion as selected from matches pane 103. Transformations pane 105 shows a list of the transformation names along with the fields to apply the transformations to along with the list of substitutions to utilize (see FIGS. 5 and 6). Rules pane 106 contains a multi-object properties grid that includes a list of rules and a set of properties for each matching rule (see FIG. 7). Strategies pane 107 shows a multi-object properties pane that includes the list of strategies, the list of properties including high and low thresholds and the list of scoring rules to be utilized (see FIG. 8). Any other type of graphical user interface elements besides panes may be utilized so long as the data associated with a respective pane is viewable by a user. The actual records to compare with one another are selected from six combinations of records, namely selected records versus themselves, selected records versus search result records, selected records versus all records, search result records versus themselves, search result records versus all records, all records versus all records (see FIG. 9).

One or more embodiments of the invention may be implemented with a computer program product that includes a computer usable memory medium having computer readable program code embodied therein that also includes a matching executable unit configured to match and merge records according to the operations and settings detailed herein. Any type of computer may be utilized in implementing an embodiment of the invention so long as the computer includes a graphical user interface and enough processing power and memory to implement the operations detailed herein. A personal computer of moderate memory and processing capabilities is on embodiment of the computer that may be utilized to execute the matching executable unit. Any programming language may be utilized to implement the functionality called for.

Figure 2:
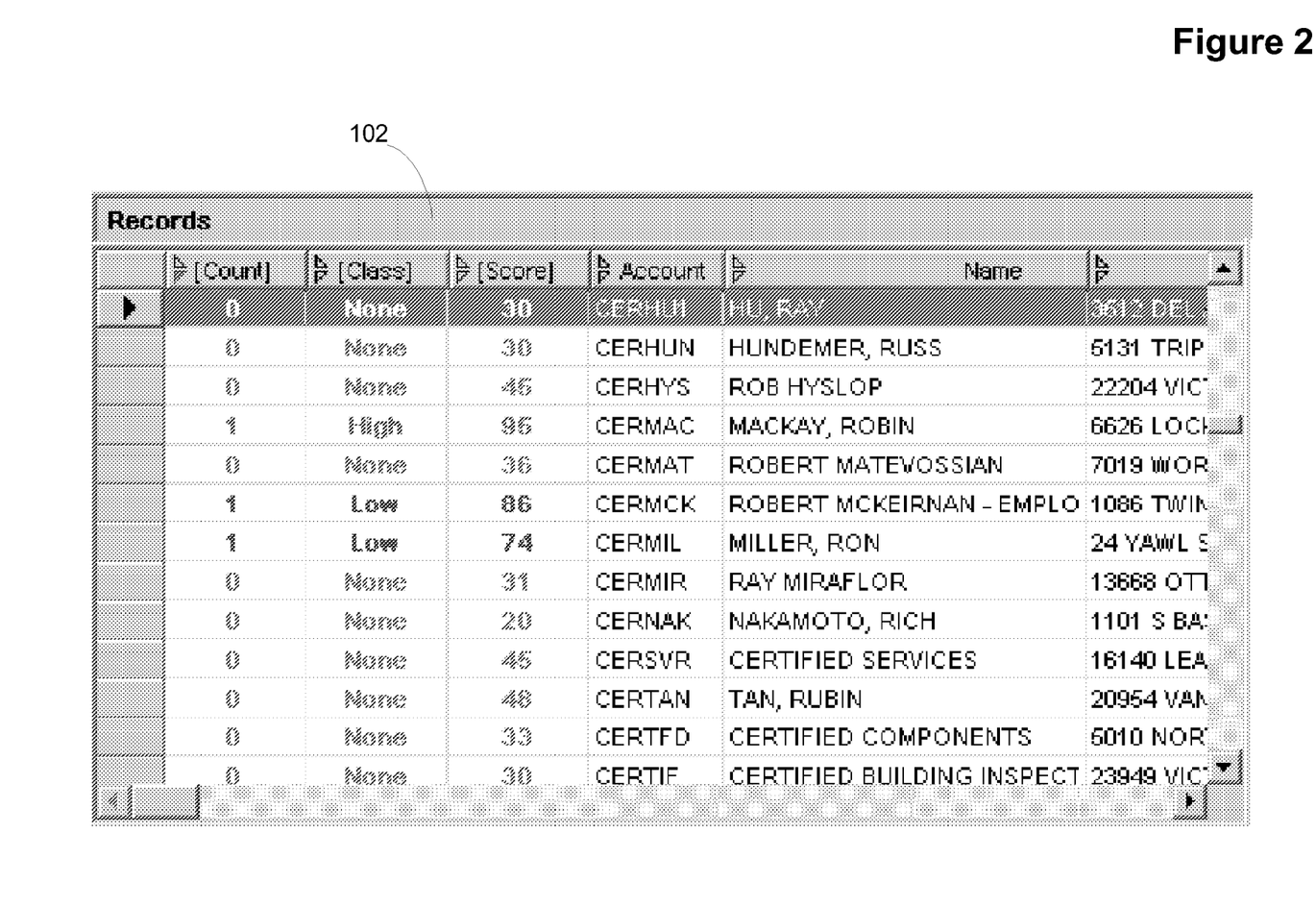
FIG. 2 illustrates a records pane showing matching results columns and fields from a database.

FIG. 2 illustrates records pane 102 showing matching results columns and fields from a database. The records pane includes a row/column grid listing the records that match the search parameters according to the search pane. Additional columns such as "count", "class" and "score" may be utilized to provide the number of matches, high/low probability of match and the weighted score of matches for example. In one or more embodiments, these columns are searchable by clicking on the header of the column to switch from low to high or high to low for example. These additional columns known as matching result columns show the result of a matching strategy.

Figure 3:
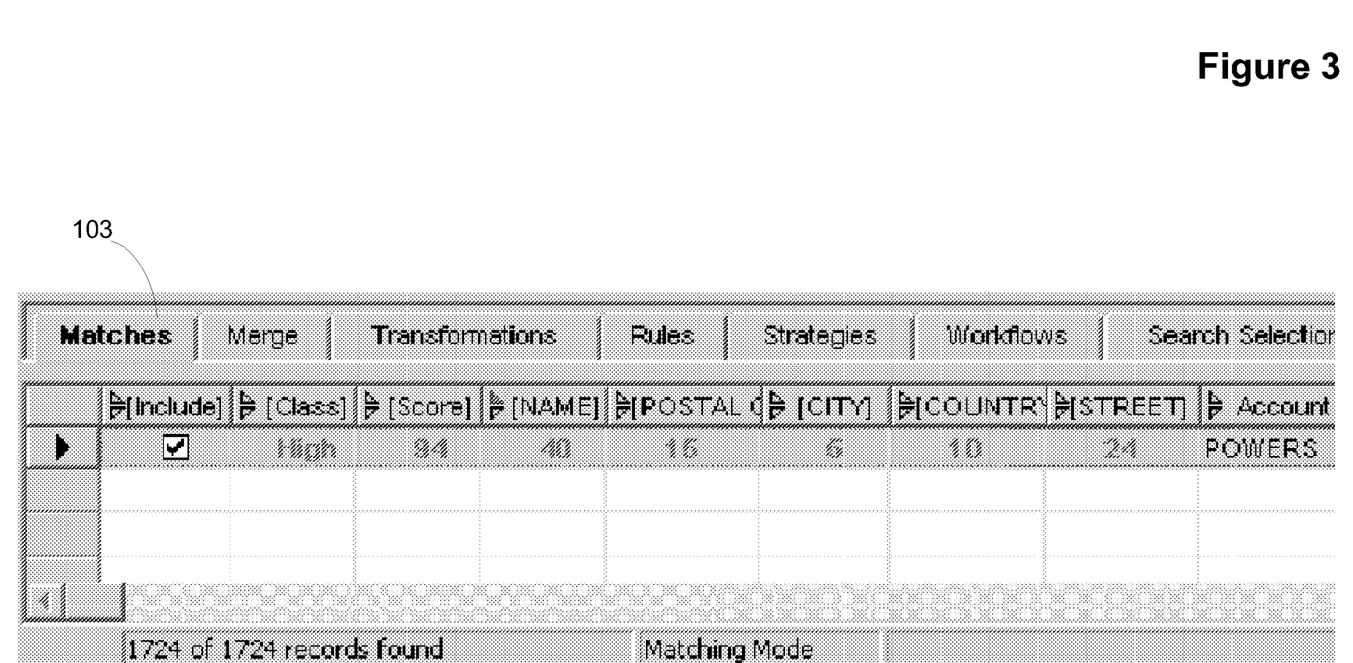
FIG. 3 illustrates a matches pane showing a list of possible matching records.

FIG. 3 illustrates matches pane 103 (including associated selection tab as called out in the figure). Matches pane 103 contains a records grid that may be utilized in one or more embodiments that has the selected record from the record pane along with all of the potential matches. By selecting desired records that appear to match in the matches pane, the selected records are listed in the merge pane for further processing. The matches pane may also display additional columns known as matching result columns that display further results obtained from executing a matching strategy. Columns "class" and "score" for example show high/low probability and a score for the match respectively. In one or more embodiments of the invention, more matching result columns may generally be displayed that in the records pane although this is not required and more, an equal number or less matching result columns may be displayed in the matches pane depending on the columns selected by a user.

Figure 4:
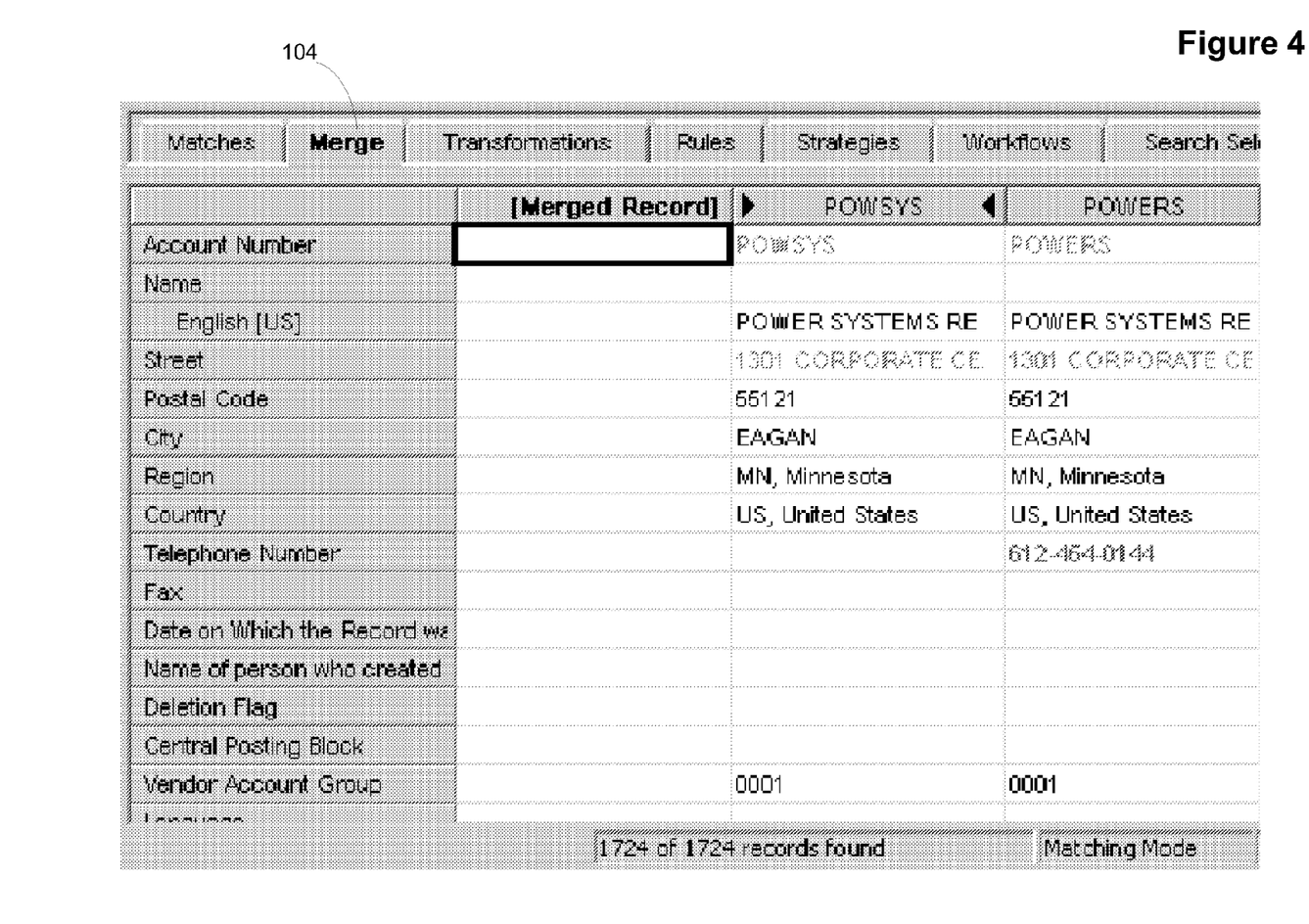
FIG. 4 illustrates a merge pane showing a side-by-side comparison of records to possibly merge as selected from the matches pane.

FIG. 4 illustrates merge pane 104. The merge pane shows records side by side that have been selected for inclusion as selected from the matches tab. The individual fields that match or closely match may be highlighted or displayed in colors that signify the level of the match of the respective field. A particular field may be shown in a particular color for example to show that the desired normalized values have replaced similar fields for example.

Figure 5:
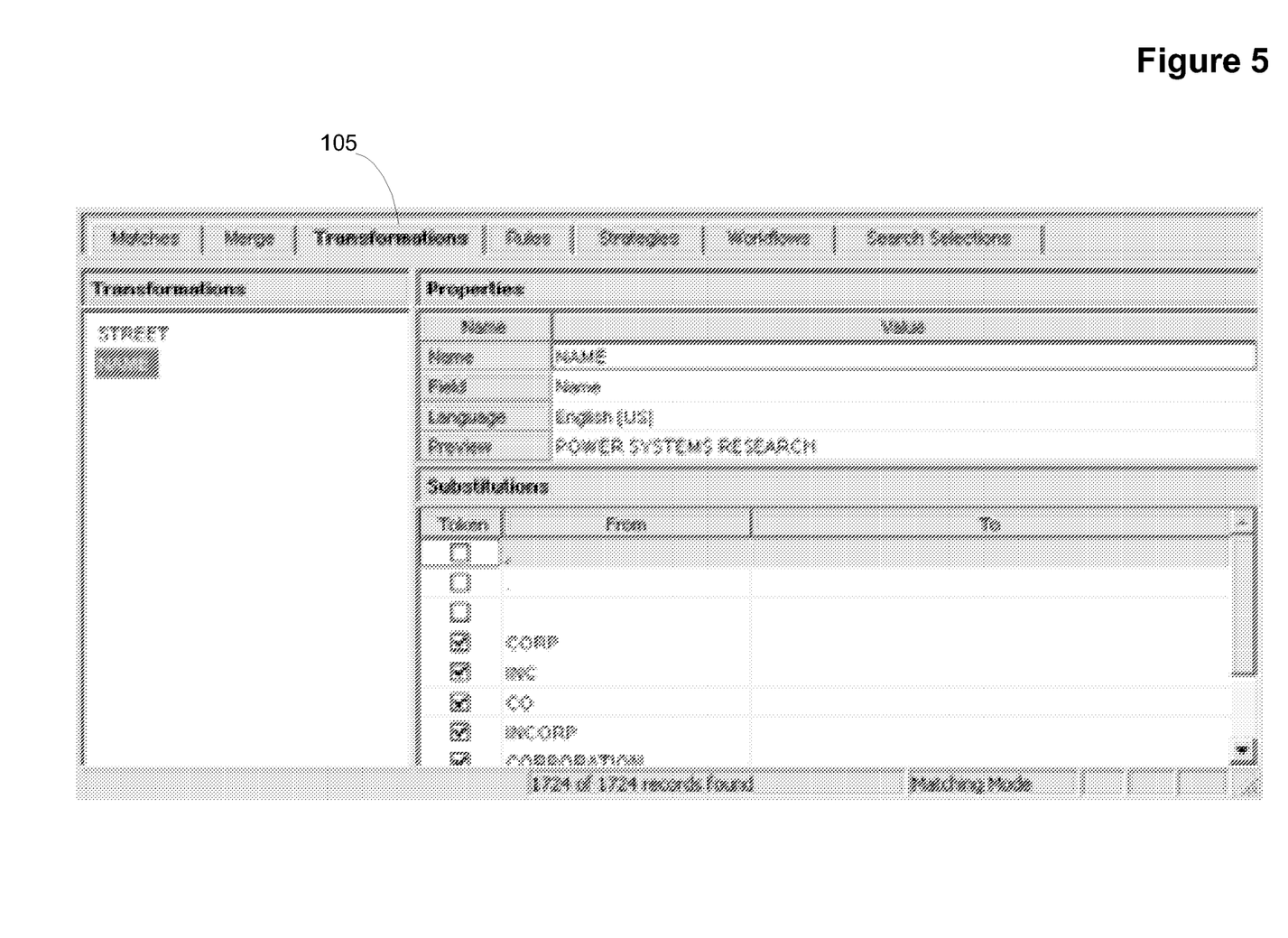
FIG. 5 illustrates a transformations pane showing the defined transformations and associated properties for each transformation.
Figure 6:
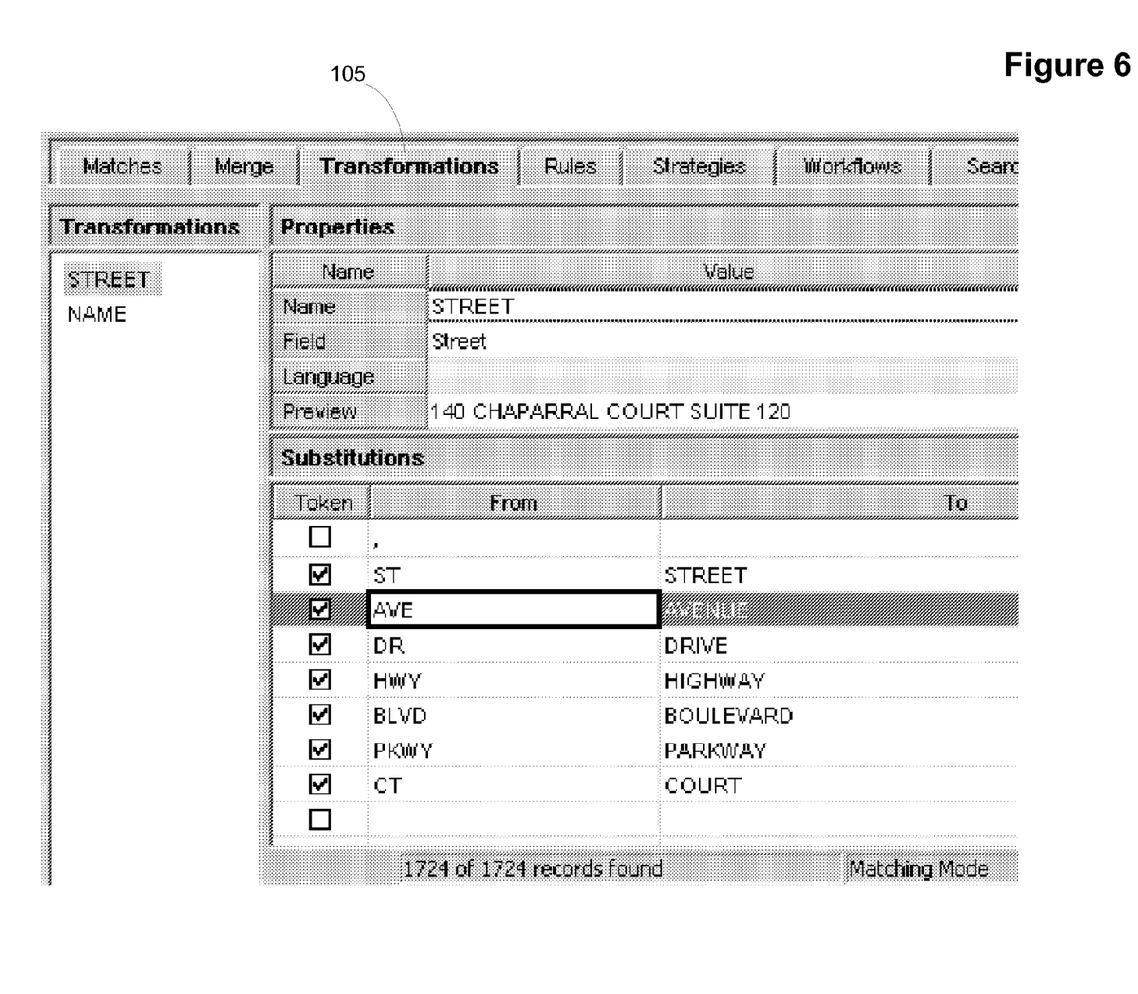
FIG. 6 shows an alternate view of the transformation pane with alternate data selected.

FIG. 5 illustrates transformations pane 105 showing the defined transformations and associated properties for each transformation. Specifically, transformation pane 105 contains a multi-object properties grid that includes three sub-panes. The three sub-panes are a transformations pane, properties pane and substitutions pane. The transformations pane lists the names of the transformations. The properties pane lists the set of properties for each transformation including the field to which the transformation is to be applied. The substitutions pane lists the substitutions that comprise the transformation. The transformations pane is used to select a named transformation and add, rename, delete and duplicate transformations and view/edit the transformation properties and to specify the set of substitutions to utilize in each transformation. A transformation applies one or more normalizing or cleansing operations to at least one field on a record-by-record basis. FIG. 6 shows an alternate view of FIG. 5 with transformation "STREET" selected, which shows defined substitutions in the lower portion of the pane.

The transformation pane further configured to accept a language layer from which to operate on a multi-lingual field. This allows for the transformation of multi-lingual data to aid in performing matches. This capability allows for merging records that are partially filled in one language but which would match a record input in another language. This capability is powerful when utilized by global enterprises that deal with large data sets of internationalized records.

Figure 7:
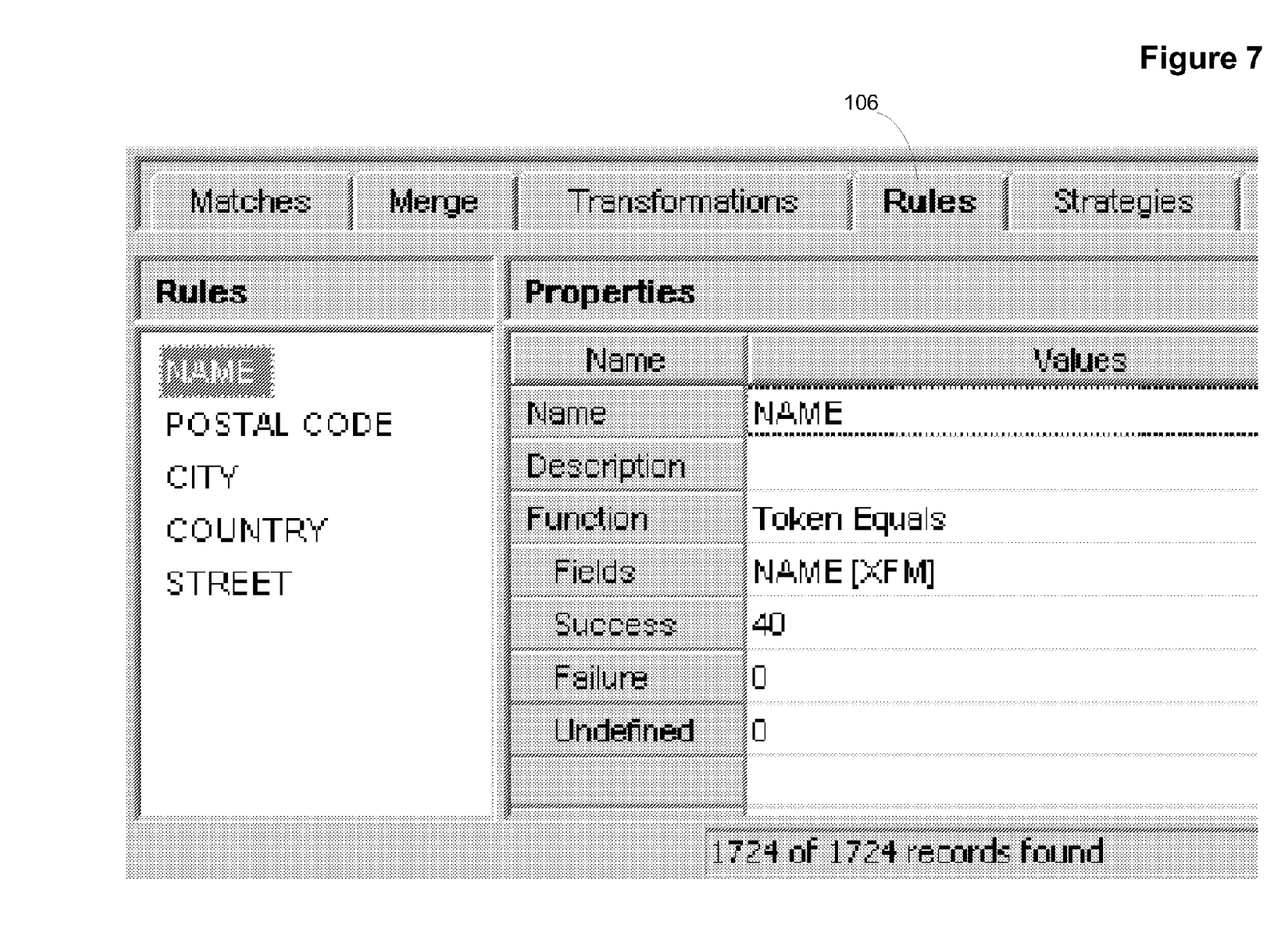
FIG. 7 shows a rules pane with a list of defined rules and associated properties listed for the selected rule.

FIG. 7 shows rules pane 106. Rules pane 106 contains a multi-object properties grid that includes a list of rules and a set of properties for each matching rule. Specifically, each rule may be associated with a function such as a token match, a list of fields and scores for success, failure and undefined results. The scores are utilized to display in various matching result columns for example. For each field or combination of fields, a matching rule applies at least one matching function to either the original or previously transformed field value(s) and returns a score. A rule that references qualifiers is evaluated individually for each qualified link combination and the score for a record pair is the best score across the entire set of qualified links. This allows for applying matching rules to data that has been condensed with sparse fields removed from a main data table for example.

Figure 8:
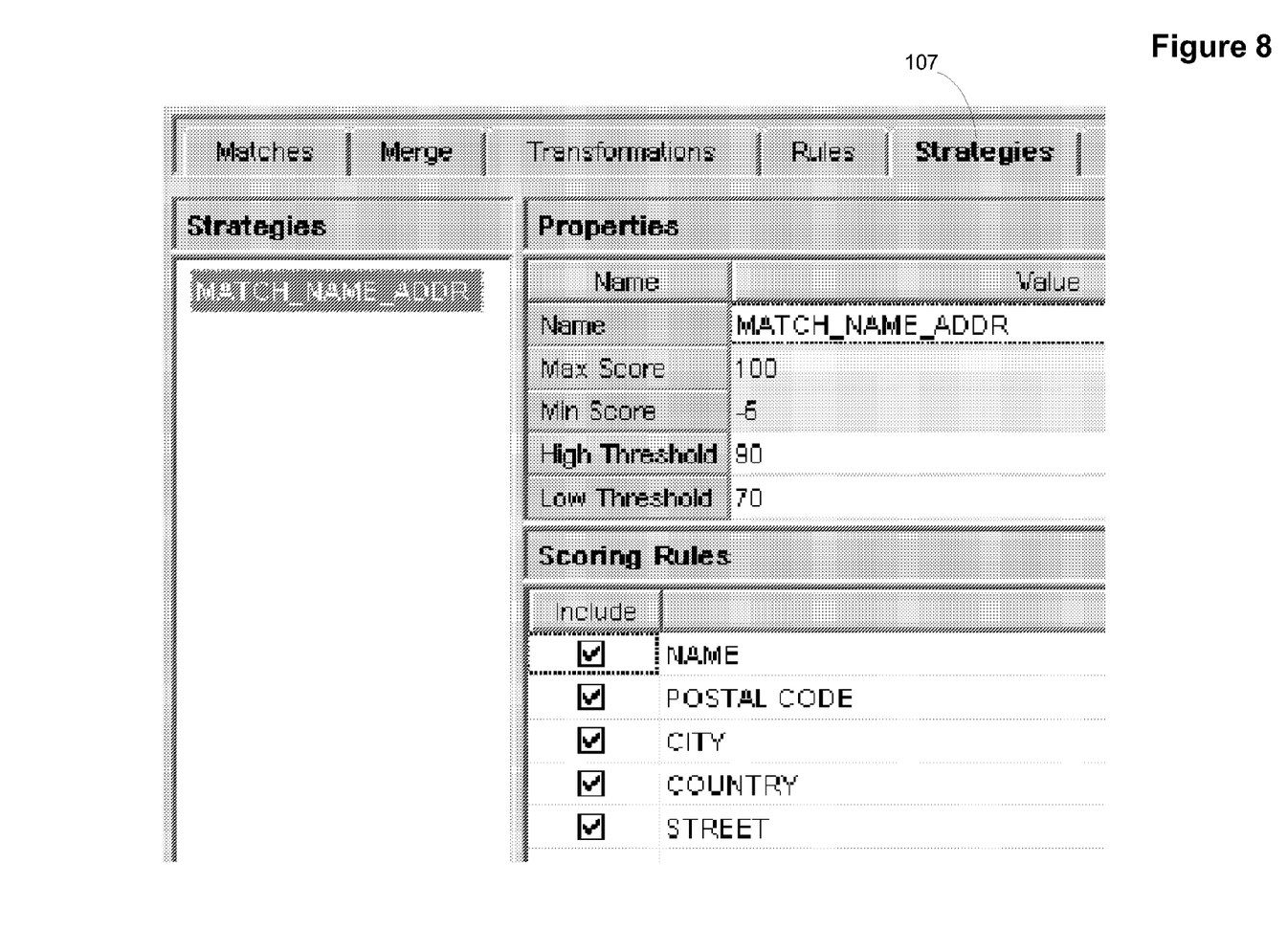
FIG. 8 shows a strategies pane with a list of defined strategies and associated properties and rules listed for the selected strategy.
Figure 9:
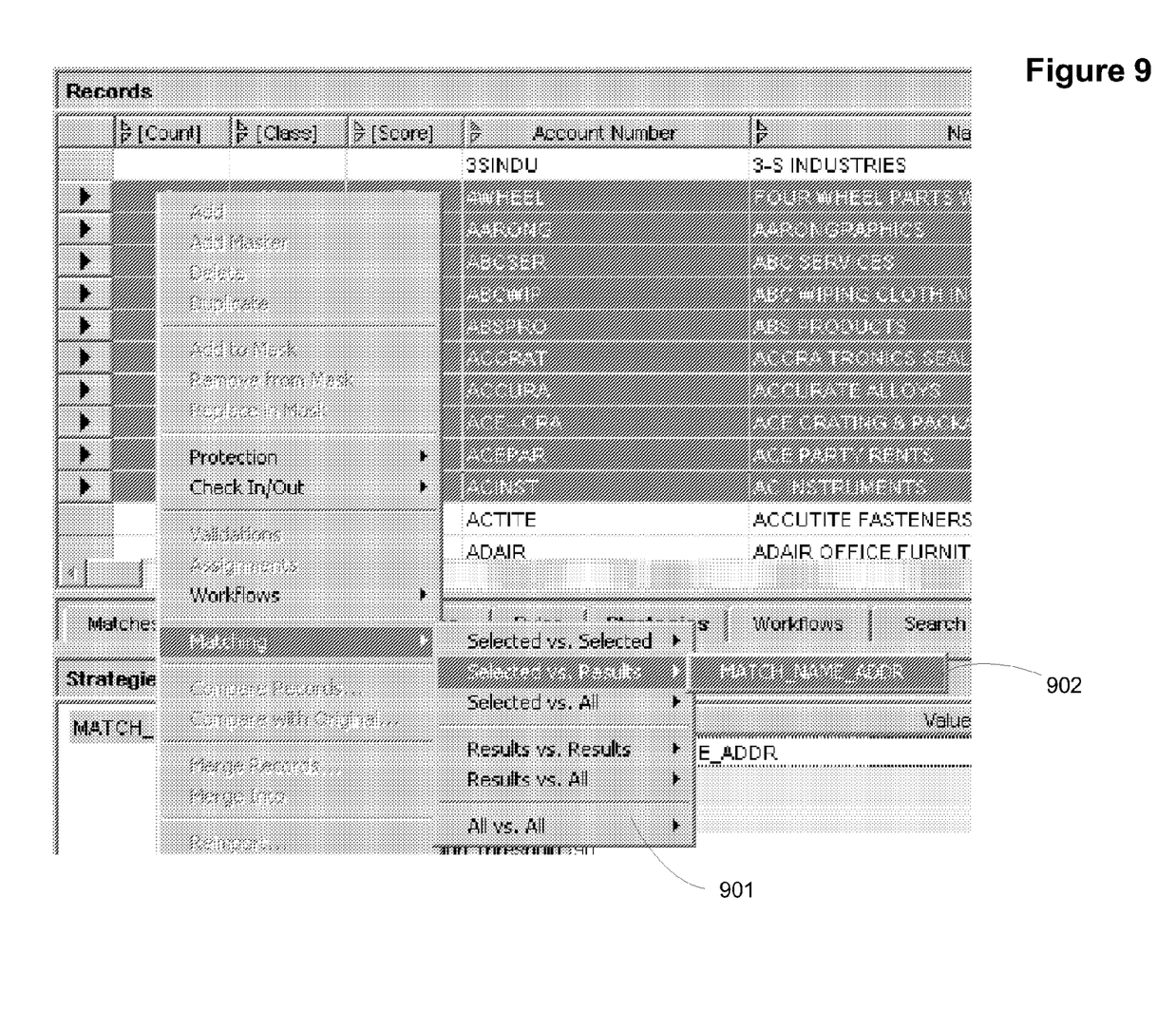
FIG. 9 shows a menu for selecting which records to compare against which records.

FIG. 8 shows a strategies pane. Strategies pane 107 shows a multi-object properties pane that includes the list of strategies, the list of properties including high and low thresholds and the list of scoring rules to be utilized. Strategies may utilize one or more rules as defined in the rules pane for example. FIG. 9 shows a menu for selecting which records to compare against which records. A matching strategy may be applied against the search results, selected records from the search results or all records in the database. Specifically, the actual records to compare with one another are selected from six combinations of records, namely selected records versus themselves, selected records versus search result records, selected records versus all records, search result records versus themselves, search result records versus all records, all records versus all records.

In one or more embodiments of the invention, tokenizing multi-word text based data items is performed to enable the comparison of individual tokens irrespective of position. Removing common or noise values for frequently used characters and strings, for example "Street", "Str.", "St.", "A", "The", etc., may be performed to limit the portions of the data items to compare to a smaller set. Alternatively, the common values may be substituted on a character or token basis. Excluding or eliminating characters that are non-essential to the match is performed. For example, the system may selectively exclude or eliminate the following characters or any other punctuation character from a field that is being matched between two records: PERIOD, QUOTE, DASH, COMMA, LEFT PAREN, RIGHT PAREN, SLASH, BACKWARD SLASH, PLUS, MINUS, STAR, AMPERSAND, BLANK, TAB, NUMBER SIGN. For example, PERIOD is a textual character represented by ".". Any other character may be added to or removed from the list of excluded characters for a given match. Results of previous user selections involving the fields of the present match may be stored by the system in order to learn what types of characters are excluded from matches that involve the particular field.

Normalizing data may be performed in order to cleanse strings to aid in searching. For example, tokens may be collapsed or substituted for one another, e.g., "California", "Calif.", "Cal.", are converted to "CA." Normalization may also include substituting characters. FIG. 6 shows an embodiment of the invention that implements substitution of characters. For example, the system may convert characters from foreign languages to base ASCII form, i.e., Ö to OE, Ø to OE, Ä to AE, Å to AA, Ü to UE, Í to I, etc. Removal of or eliminating non-name tokens may also take place. For example, the system may remove the following non-name tokens before attempting a match: AB, INC, LLC, CORP, LTD, SA, AS, SACI, BV, SARL, KK, SPA, AG, LTDA, APS, PTY, PLC, LLP, LLC, GMBH, SDN BHD, (DO NOT USE!), SAS, DE, EDI, DV, SAU, HB, KB, SP200, SRL, KFT, BEIJING, NANJING, CHONGQING, GUANGZHOU, SVENSKA, SVERIGES.

Results of previous user selections involving each field for a match may and in general are different. The selections are stored by the system in order to learn what types of characters are excluded from matches and what normalizations occur for a particular match involving a particular field. In addition, the initial presentation of the information related to a match may utilize data that has been learned by the system from previous interactions with users that utilize given fields in creating match criteria. Furthermore, the weight values used may apply to first or subsequent matches within a field and may have different values for the first or subsequent token matches within the field. Presentation of a list for a match that is being constructed by a user with values pre-assigned as learned by embodiments of the system saves the user from re-inventing the match for example.

Generating groups of similar records is performed to allow for the display of these records in relation to one another so that a decision can be made and thereafter learned by the system for future use. Assigning thresholds for given records to determine when a match is a duplicate requiring no further user intervention is performed. This allows for records that have similar tokens to auto-match for all future testing so that a user is not required to intervene in the matching process when a particular match score is achieved. The matching thresholds may be table specific or based on a field or value in a field for example.

Each of the steps implementing an embodiment of the method may utilize past user input to provide choices to the user for streamlining subsequent matching operations. For example, adapting the choices that are provided to a user based on past user input allows for match parameters to be configured in rapid fashion. Furthermore, normalization rules may be presented in varying form based on the data sources and the geography where the normalization has occurred in the past and is to occur during the current match. The ability to learn which tokens are relevant and when they are relevant in a particular order allows for the system to present token lists that are limited by system interactions with previous users. Based on previous user input, the system is configured to learn for a given match whether to compare all tokens in a field regardless of position with a first token of a test field or whether to compare all tokens within both fields irrespective of position. This allows for the construction of further matches that take advantage of previous user inputs in providing choices to a user for creation of a new match. The system also learns weights for tokens as previously gathered from user interactions and may provide lists or ranges of weights that previous matches have used in order to guide the user in creating a new match. The weights may be specific to particular groups of data or elements in various data sources. For example, a postal code may have a high weight in one match type and a low weight for a different match based on a different set of compared records or fields. The system is configured to present the weights for tokens that make sense for the data that is being matched. This allows for the presentation of choices to a user that minimizes the amount of time that a user must interact with the system to define a match. The matches may be applied to any record and field in any table of a corporate database.

One embodiment of the apparatus performs the following operations utilizing the graphical user interface defined herein along with the matching executable unit. The matching executable unit presents a transformation pane configured to manipulate a transformation name, field, wherein the transformation pane is configured to accept inputs that enable the matching executable unit to substitute at least one character in the field with a second at least one character in the field. Furthermore, the matching executable unit is configured to eliminate at least one punctuation character in the field, substitute at least one token in the field with a different token in the field, eliminate at least one noise token in the field, and collapse at least one variation of a name token in the field.

The matching executable unit is further configured to present a rules pane. The rules pane is configured to manipulate a rule name, the field, function and at least one weight and to accept inputs to add the at least one weight depending on a match result for a rule defined by the rule pane. The matching executable unit is further configured to present a strategies pane configured to manipulate a strategy name, a score, a threshold, and at least one rule wherein the strategies pane is configured to execute a strategy comprising the at least one rule on a first set of records with respect to a second set of records.

The matching executable unit is also configured to present at least one matching results column in a records pane, present a matches pane that lists all records that result from the execute of the strategy, present a merge pane that lists all records selected from the matches pane and accept input to merge at least two records displayed on the merge pane. Any other order of operations that allow for the transformations, rules, strategies and which records to compare against a second set of records to yield a matches and merge display of information is in keeping with the spirit of the invention.

While the invention herein disclosed has been described by means of specific embodiments and applications thereof, numerous modifications and variations could be made thereto by those skilled in the art without departing from the scope of the invention set forth in the claims.

What is claimed is:

1. A computer program product for matching non-normalized data values comprising:
a computer usable memory medium having computer readable program code embodied therein wherein said computer readable program code comprises a matching executable unit configured to:
present a transformation pane configured to manipulate a transformation name, field, wherein said transformation pane is configured to accept inputs that enable said matching executable unit to:
substitute at least one character in said field with a second at least one character in said field;
eliminate at least one punctuation character in said field;
substitute at least one token in said field with a second at least one token in said field;
eliminate at least one noise token in said field;
collapse at least one variation of a name token in said field;
present a rules pane configured to manipulate a rule name, said field, function and at least one weight wherein said rule pane is configured to accept inputs that enable said matching executable unit to:
add said at least one weight depending on a match result for a rule defined by said rule pane;
present a strategies pane configured to manipulate a strategy name, a score, a threshold, and at least one rule wherein said strategies pane is configured to accept inputs that enable said matching executable unit to:
execute a strategy comprising said at least one rule on a first set of records with respect to a second set of records;
present at least one matching results column in a records pane;
present a matches pane that lists all records that result from said execute of said strategy;
present a merge pane that lists all records selected from said matches pane; and,
accept input to merge at least two records displayed on said merge pane.

2. The computer program product of claim 1 wherein said computer readable program code is further configured to:
said transformation pane further configured to accept a language layer from which to operate on a multi-lingual field.

3. The computer program product of claim 1 wherein said at least one weight comprises a success weight.

4. The computer program product of claim 1 wherein said at least one weight comprises a failure weight.

5. The computer program product of claim 1 wherein said at least one weight comprises an undefined weight to add when at least one tested field is null.

6. The computer program product of claim 1 wherein said at least one score comprises a maximum score.

7. The computer program product of claim 1 wherein said at least one score comprises a minimum score.

8. The computer program product of claim 1 wherein said at least one threshold comprises a high threshold.

9. The computer program product of claim 1 wherein said at least one threshold comprises a low threshold.

10. The computer program product of claim 1 wherein said first set of records comprises selected records and said second set of records comprises said selected records.

11. The computer program product of claim 1 wherein said first set of records comprises selected records and said second set of records comprises search result records.

12. The computer program product of claim 1 wherein said first set of records comprises selected records and said second set of records comprises all records.

13. The computer program product of claim 1 wherein said first set of records comprises search result records and said second set of records comprises said search result records.

14. The computer program product of claim 1 wherein said first set of records comprises search result records and said second set of records comprises all records.

15. The computer program product of claim 1 wherein said first set of records comprises all records and said second set of records comprises all records.

16. The computer program product of claim 1 wherein said matching results column comprises a count column.

17. The computer program product of claim 1 wherein said matching results column comprises a class column.

18. The computer program product of claim 1 wherein said matching results column comprises a score column.

19. The computer program product of claim 1 wherein said computer readable program code is further configured to:
said rules pane configured to present a list of tokens and corresponding weight values most often chosen in matches involving said field.

20. A computer program product for matching non-normalized data values comprising:
a computer usable memory medium having computer readable program code embodied therein wherein said computer readable program code comprises a matching executable unit configured to:
present a transformation pane configured to manipulate a transformation name, field, wherein said transformation pane is configured to accept inputs that enable said matching executable unit to:
substitute at least one character in said field with a second at least one character in said field;
eliminate at least one punctuation character in said field;
substitute at least one token in said field with a second at least one token in said field;
eliminate at least one noise token in said field;
collapse at least one variation of a name token in said field;
accept a language layer from which to operate on a multi-lingual field;
present a rules pane configured to manipulate a rule name, said field, function and at least one weight wherein said rule pane is configured to accept inputs that enable said matching executable unit to:
add said at least one weight depending on a match result for a rule defined by said rule pane;
present a strategies pane configured to manipulate a strategy name, a score, a threshold, and at least one rule wherein said strategies pane is configured to accept inputs that enable said matching executable unit to:
execute a strategy comprising said at least one rule on a first set of records with respect to a second set of records;
present at least one matching results column in a records pane;
present a matches pane that lists all records that result from said execute of said strategy;
present a merge pane that lists all records selected from said matches pane; and,
accept input to merge at least two records displayed on said merge pane.

* * * * *